(12) United States Patent
Naka et al.

(10) Patent No.: US 6,222,560 B1
(45) Date of Patent: Apr. 24, 2001

(54) TRANSMITTER-RECEIVER OF THREE-DIMENSIONAL SKELETON STRUCTURE MOTIONS AND METHOD THEREOF

(75) Inventors: Toshiya Naka; Yoshiyuki Mochizuki, both of Oosakashi (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/243,504

(22) Filed: Jan. 26, 1999

Related U.S. Application Data

(63) Continuation of application No. 08/842,529, filed on Apr. 24, 1997, now Pat. No. 5,909,218.

(30) Foreign Application Priority Data

Apr. 25, 1996 (JP) .................................................. 8-105077

(51) Int. Cl.[7] .................................................. G06T 15/00
(52) U.S. Cl. .................................................. 345/474; 345/473
(58) Field of Search .................................. 345/428, 472, 345/473, 474

(56) References Cited

U.S. PATENT DOCUMENTS

| | | | |
|---|---|---|---|
| 5,577,175 | 11/1996 | Naka et al. | 395/127 |
| 5,764,232 | 6/1998 | Oouchi | 345/419 |
| 5,764,233 | 6/1998 | Brinsmead et al. | 345/419 |
| 5,777,619 | 7/1998 | Brinsmead et al. | 345/419 |

FOREIGN PATENT DOCUMENTS 7-312005 11/1995 (JP) .

OTHER PUBLICATIONS

"A Method of Frame Representation of Moving Objects for Knowledge–Based Coding"; Systems & Computers in Japan, vol. 21, No. 7, Jan. 1, 1990, pp. 63–74, XP000172928 *p. 63, left–hand col., line 22—right–hand col., line 12*, p. 65, left–hand col., line 1—p. 72, left–hand col., line 3*—Tadahiko Kimoto et al.

"Human Figure Synthesis and Animation for Virtual Space Teleconferencing"; Virtual Reality Annual International Symposium, Mar. 11, 1995, New York; pp. 118–126, XP000529978 *p. 118, left–hand col., line 25—right–hand col., line 20*, p. 119, right–hand col., line 14—line 18; figure 2*—Singh K. et al.

*Primary Examiner*—Cliff N. Vo
(74) *Attorney, Agent, or Firm*—Parkhurst & Wendel, L.L.P.

(57) ABSTRACT

A transmitter-receiver of three dimensional skeleton motions in which motion data of a skeleton structure in three-dimensional computer graphics (CG) is transmitted from a transmitting end to a receiving end using first and second formats. In the first format, initial information and time series data is interpreted to decide the posture of the skeleton structure according to kinematics, and in the second format, the initial information and data in which disassembled element data is accompanied by the connection methods thereto is interpreted to decide the posture of the skeleton structure according to kinematics.

38 Claims, 12 Drawing Sheets

```
Segment Neck
Site Neck. NeckBase  -p 0.00 0.00 0.00
Site Neck. NeckBase  -r 0.00 0.00 0.00
Site Neck. SkullBase -p 0.00 0.00 19.00
Site Neck. SkullBase -r 0.00 0.00 0.00

Joint SkullBase -c Neck. SkullBase Head. SkullBase
Joint SkullBase -t ball
Joint SkullBase -l -180.0 -180.0 -180.0 180.0 180.0 180.0

Handle RightHand -c RightShoulder Righthand. Endsite
```

- ⊘ end site
- ○ joint
- — segment

Fig.12

| | |
|---|---|
| STEP_1 | set right hand tip right forward of face (set starting point) |
| STEP_2 | set right hand tip a little upper left (sub-three-dimensional virtual space X direction 2, Y direction 3) |
| STEP_3 | specify right hand finger shape (open a hand, no twist) |
| STEP_4 | set movement matrix of sub space |
| STEP_5 | set starting time |
| ...... | set control point |
| STEP_n | set right hand tip left forward of waist (set end point) |
| STEP_n+1 | set right hand tip a little upper (sub-three-dimensional virtual space Z direction 1) |
| STEP_n+2 | set end time |

Fig.13

```
Right Hand = { Inverse, Translate,
               Start Motion => < sub block number >, < t0 >,
               Variation of hand shape,
               Trace Motion1 => < sub block number >, < t0 + Δt >,
               Trace Motion2 => < sub block number >, < t0 + Δt >,
                 ......
               End Motion => < sub block number >, < t1 >,
               Variation of hand shape,
               Interpolation, < Spline >,
             }
 Left Hand = { Inverse, Translate,
               Start Motion => < sub block number >, < t0 >,
               Variation of hand shape,
               Trace Motion1 => < sub block number >, < t0 + Δt >,
                 ......
               End Motion => < sub block number >, < t1 >,
               Variation of hand shape,
               Interpolation, < Spline >,
             }
 Face Head = { Inverse, Translate,
               Start Motion => < sub block number >, < t0 >,
               Variation of face expression,
               Trace Motion1 => < sub block number >, < t0 + Δt >,
                 ......
               End Motion => < sub block number >, < t1 >,
               Variation of face expression,
               Interpolation, < Spline >,
             }
```

US 6,222,560 B1

TRANSMITTER-RECEIVER OF THREE-DIMENSIONAL SKELETON STRUCTURE MOTIONS AND METHOD THEREOF

This is a continuation of application Ser. No. R1.53 (b) Cont Appln of Ser. No. 08/842,529 filed Apr. 24, 1992, now U.S. Pat. No. 5,909,218.

FIELD OF THE INVENTION

The present invention relates to transmitter-receiver of three-dimensional skeleton structure motions and its method, which efficiently transmits/receives natural motions of a character having a complex skeleton -structure, e.g., human beings, when producing or commercially utilizing three dimensional computer graphics (3DCG) based on network, e.g., internet.

BACKGROUND OF THE INVENTION

As a 3DCG application, virtual malls on internet, e.g., WWW (world wide web) and various homepages have been noticeable. Particularly, the rapid developments of internet helps to improve the circumstances in which 3DCG of such as games and movies are readily handled at home.

In a conventional WWW, a machine called "server," such as a personal computer (PC) and workstation, is connected, through internet, to a plurality of machines called "client," such as PC. In response to the demand of a client, as required, data including information on picture image, voice, text and layout provided by a server is downloaded, and then reconstructed at the client side to obtain necessary information. In such communication between servers and clients, there is utilized a communication procedure based on TCP/IP (transmission control protocol/internet protocol).

Conventional data provided by servers were mainly text data and picture image data. Recently, the standardization of VRML (virtual reality modeling language) and the browser of the VRML advanced, and the modern trend is toward the transfer of 3DCG data itself, such as shapes and scenes.

Brief description will be given of the VRML. To transfer picture data, particularly moving picture data using a conventional data format mainly for picture image and text, e.g., HMTL (hyper text markup language), requires much transfer time and costs. Therefore, network traffic restriction is imposed on the present-day system. In a conventional 3DCG, shape, viewpoint and lighting information were all processed by three-dimensional data. As computer graphics (CG) technology is advanced, the image quality of picture image created by CG is rapidly improved. In view of data quantity, it is more efficient to transfer CG data as it is. In this case, data compression ratio is normally not less than 1/100 of the transfer of the equivalent picture image data. Therefore, the modern trend is toward the standardization of the transfer method of 3DCG data through network. As an attempt, the standardization of 3DCG data called "VRML" has been proposed (VRML Ver. 2.0). The VRML Ver. 2.0 defines, for example, shape data called "primitive," data format of various lighting source data, viewpoint data and texture data, and the designation process of rigid body motion.

Among the conventional CG field, animation that produces picture image in real-time, i.e., so-called real animation, is worthy of remark. The reproduction of the real motion of CG characters utilizing a real animation, is being studied mainly in the field of CM (commercial message) and movies. There are for example a method called "kinematics method" in which a complex shape such as human being is represented by a skeleton structure (hierarchical structure), and its complex motion is reproduced naturally by the definitions of the motion quantity of the joints of skeletons that change from time to time.

The aforementioned kinematics method was primarily developed in the-field of robotics engineering. This method is to decide the posture of a skeleton model having a linear link structure comprising links and joints, by setting the angle of rotations in the directions of X, Y and Z axes of the joint parts of the skeleton model, and the motion quantity (position) in the directions of X, Y and Z axes.

By utilizing the kinematics method in a character of an arbitrary skeleton structure created by CG, it is being able to decrease the data quantity and reproduce natural motions of such as human being and dinosaurs, compared to a conventional polygon based animation that is created by the simultaneous use of key frame method and the like.

In 3DCG modeling language on a conventional internet in which VRML plays a central role, however, it is present condition that no consideration is given to methods for defining continuous time series motions of objects, and that there is no method for defining the motions of complex shapes of human being and the like, i.e., natural postures of hands and feet.

In a conventional animation creation based on kinematics method, the creation of smooth motions requires much motion data. In terms of applications to network, traffic issue is left unsettled.

SUMMARY OF THE INVENTION

It is an object of the present invention to realize that between clients and servers being connected on internet, complex shapes (avatar) of such as human being having a skeleton structure (hierarchical structure) and motion data serving as the base of the avatar are transmitted/received, and the avatar is then interactively operated with each other in three-dimensional virtual space on network.

Other objects and advantages of the present invention will become apparent from the detailed description given hereinafter; it should be understood, however, that the detailed description and specific embodiment are given by way of illustration only, since various changes and modifications within the scope of the invention will become apparent to the those skilled in the art from this detailed description.

The present inventors have found out that the above objects can be attained by the following facilities:

(i) a mechanism for defining a complex structure of such as human being by a skeleton structure, compressing, restoring and transmitting/receiving the reference position (hereinafter referred to as "root") of a specified skeleton and the motion information of each joint position of the skeleton;

(ii) a mechanism for disassembling the motion data of the skeleton structure to be added to an initial information, which comprises the hierarchical relationship of the skeleton structure, the initial state of the skeleton structure, constraint of the skeleton structure (e.g., the degree of freedom of each joint rotation and the rotation range), shape data to be attached to skeletons and data relative to the attachment to the skeleton structure, into the representative element data of the motions in three-dimensional virtual space (hereinafter referred to as "basic motion"), transmitting/restoring the disassembled basic motions together with methods for connecting the representative motions of the basic motions;

(iii) a mechanism for deciding the postures of necessary skeleton structures based on the transmitted/received animation information; and (iv) a mechanism for interactively altering, for example, the operations of motions such as the directions of motions and the stream of the basic motions, according to the instructions of users who operate based on the motions of avatars to be transmitted/received.

In accordance with this finding, in transmitting/receiving three-dimensional motions of a character having a complex structure such as human being, it is possible to define a human hierarchy by a skeleton structure and then transmit/receive, in time series, the motion quantity of some joints of the defined skeleton structure in three-dimensional virtual space. It is also possible to add, into representative motion elements, connection methods thereto, and then transmit/receive it. These enable to transmit/receive natural and smooth motions of characters in transmission/receiving system based on network, thereby considerably reducing the data quantity during the transfer.

BRIEF DESCRIPTION OF THE DRAWINGS

FIG. 12 is a diagram of a stream for creating motion data from human motions.

FIG. 13 is a diagram of a script expression of motion data of a CG skeleton structure.

DETAILED DESCRIPTION OF THE PREFERRED EMBODIMENT

An embodiment of the present invention will be described referring to the accompanying figures.

Figure 1:
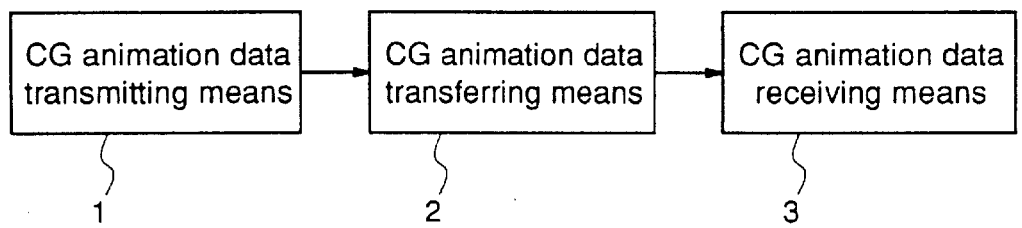
FIG. 1 is a block diagram showing a structure of a transmitter/receiver of three-dimensional skeleton structure motions according to an embodiment of the present invention.

Referring to FIG. 1, a transmitter/receiver of three-dimensional skeleton structure motions according to this embodiment is one in which from a transmitting end, motion data of a skeleton structure in 3DCG is transmitted to a receiving end, and animation is then created at the receiving end based on the transmitted motion data of the skeleton structure. The transmitter/receiver is provided with CG animation data transmitting means 1, CG animation data transferring means 2 and CG animation data receiving means 3.

Figure 2:
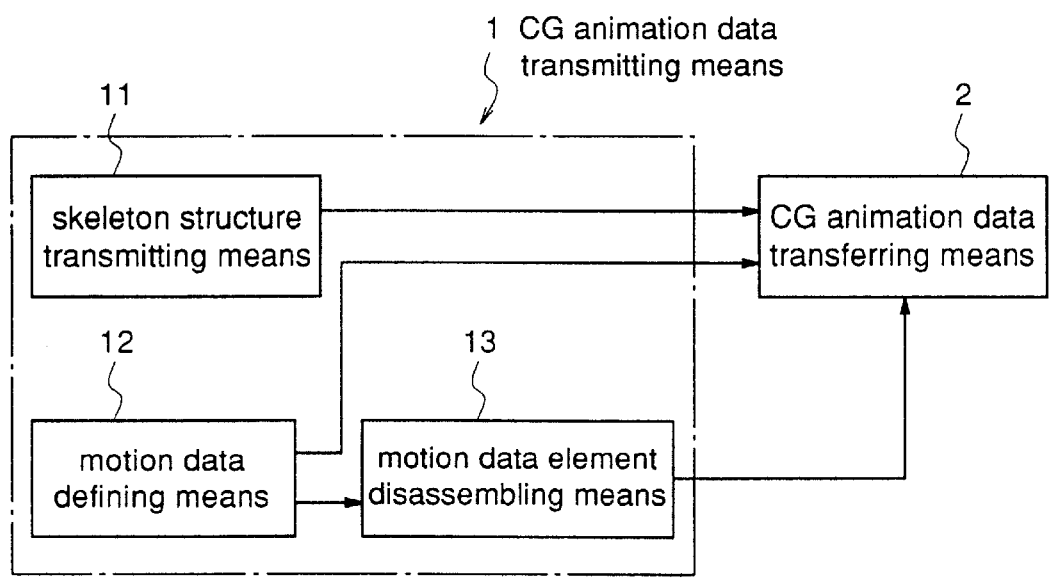
FIG. 2 is a block diagram showing a structure of a CG animation data transmitting means.

Referring to FIG. 2, the CG animation data transmitting means 1 is provided with skeleton structure defining means 11, motion data defining means 12 and motion data element disassembling means 13. Depending on requirements from a receiving end, the CG animation data transmitting means 1 is to add motion data of a skeleton structure to an initial information and then transmit. Specifically, it is decided whether the motion data of a skeleton structure should be transmitted as time series data (hereinafter referred to as "transmission format I"), or the motion data of the skeleton structure should be disassembled into basic motions which characterize the motions in three-dimensional virtual space, so that it is transmitted as data in which the disassembled basic motions is accompanied with the connection method thereto (hereinafter referred to as "transmission format II"). Based on the decided transmission format, the transmitting means 1 is to add the motion data of the skeleton structure to the initial Information, followed by its transmission. The initial information include hierarchical data for defining hierarchical relationships of the skeleton structure, the initial state of the hierarchy data, constraint of skeleton joints, shape data to be attached to the skeletons, data relative to the attachment to the skeleton structure, moving picture data stream that perform moving picture mapping of some of shape data, and mapping methods.

Referring again to FIG. 1, the CG animation data transferring means 2 is to transfer CG animation data, in which motion data of a skeleton structure is added to an initial information, from the transmitting end computer to the receiving end computer by using a transferring program on the transmitting end and a receiving program on the receiving end.

Figure 3:
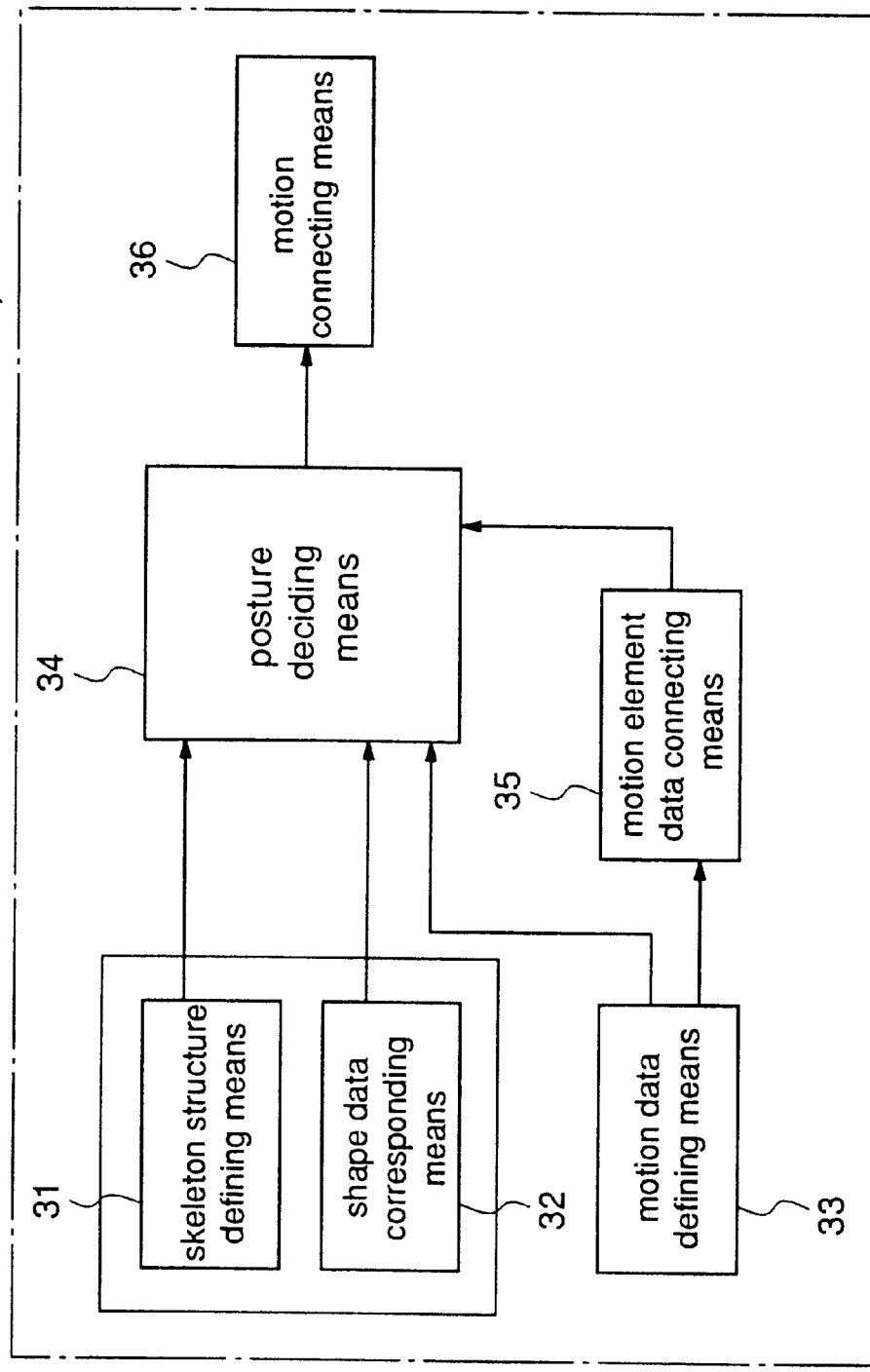
FIG. 3 is a block diagram showing a structure of a CG animation data receiving means.

Referring to FIG. 3, the CG animation data receiving means 3 is provided with skeleton structure defining means 31, shape data corresponding means 32, motion data defining means 33, posture deciding means 34, motion element data connecting means 35 and motion connecting means 36. The CG animation data receiving means 3 is to receive CG animation data transferred from the CG animation data transferring means 2; to distinguish the transmission format of the received CG animation data; to interpret an initial data and motion data of a skeleton structure which have been transmitted by the distinguished transmission format; and to decide the posture of the skeleton structure according to kinematics.

Specifically, when the transmission format is the transmission format I, the CG animation data receiving means 3 is to interpret the initial information and the motion data of the skeleton structure transmitted as time series data and then to decide the posture of the skeleton structure according to kinematics. On the other hand, when the transmission format is the transmission format II, the CG animation data receiving means 3 is to interpret the initial information, and the motion data of the skeleton structure in which the connection process to the disassembled basic motion has been added to the disassembled basic motion, and then to decide the posture of the skeleton structure according to kinematics.

Description will be given of the operation of the transmitter/receiver of three-dimensional skeleton structure motions.

The CG animation data transmitting means 1 decides, depending on requirements from the receiving end, as to whether it should be transmitted by the transmission format I or II and, based on the decided transmission format, adds the motion data of the skeleton structure to the initial information, followed by transmission.

Figure 4:
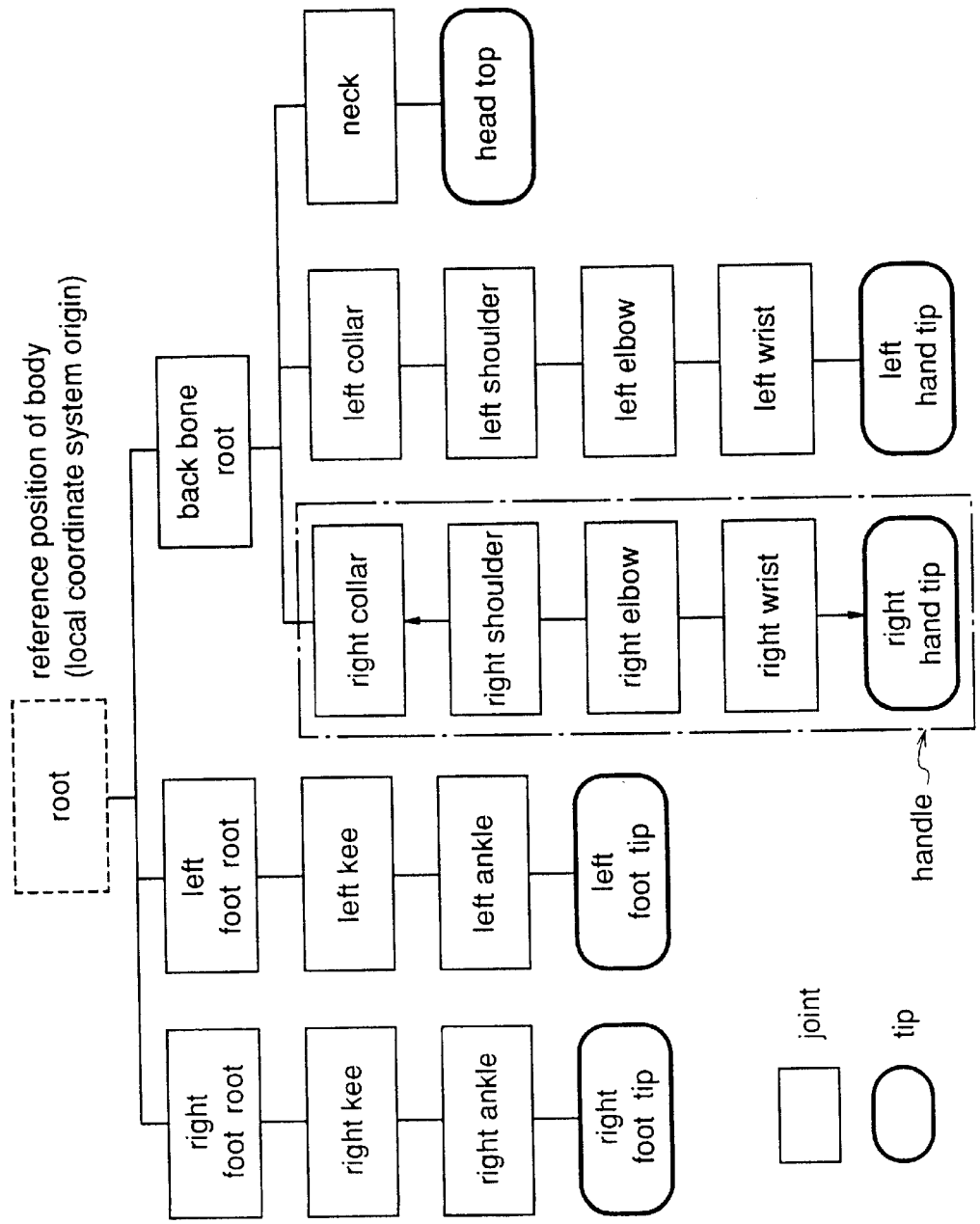
FIG. 4 is a diagram showing a hierarchical relationships of human skeleton structure.
Figure 10:
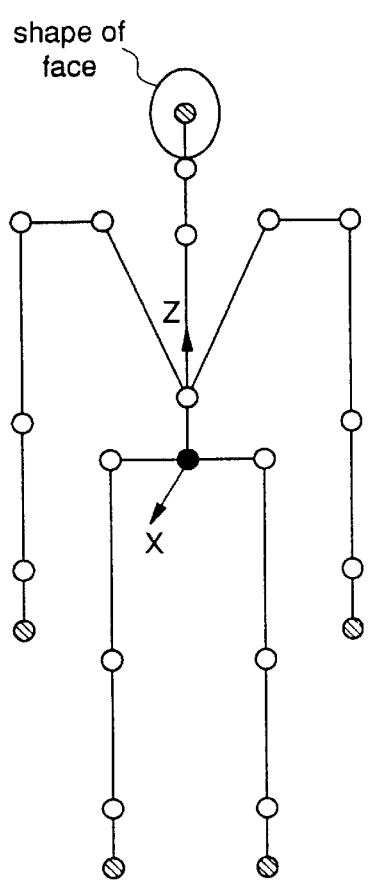
FIGS. 10(a) and 10(b) are diagrams showing a method for mapping human basic skeletons and face shape..
Figure 10:
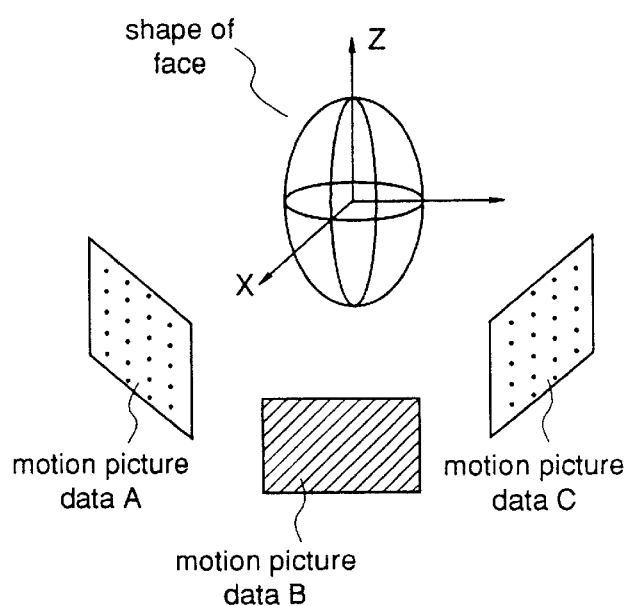

At this time, the skeleton structure defining means 11 defines, by a skeleton structure, a CG character as a transmission object having complex skeleton, e.g. human being, and then sets a root (reference position of calculation) to the top level parent position of the hierarchical structure of the defined skeleton structure. At this stage, for instance, human being has the skeleton structure as shown in FIGS. 4 and 10(*a*). Its root is normally set in the center of gravity of the body, e.g. groins of feet, and the origin of a local coordinate system of a CG character (hereinafter referred to as "right-handed system of Z top) is placed there.

In FIG. 4, parts surrounded by square are joints of a skeleton structure. Lines linking the joints correspond to portions of arms or feet, which are called "link" or "segment". Parts surrounded by ellipse are tip portions of hands or feet, which are called "end site." FIG. 4 shows a basic skeleton. As required, the hierarchy of a skeleton structure is altered. For instance, when it is required to express in more detail the hierarchy of hands of the skeleton structure shown in FIG. 4, the hierarchies of fingers and thumb, and the joints contained in the hierarchies may be provided under wrists.

In addition to the hierarchical relationship of the aforementioned joints, the hierarchical initial states are set to the skeleton structure. For instance, there are set initial directions of the lengths of arms and legs. Further, the moving ranges of the joints are set to the skeleton structure. For instance, it is set that the right elbow is rotatable from a certain degrees to a certain degrees in the rotations X, Y and Z axes of the local coordinate system, respectively.

Figure 5:
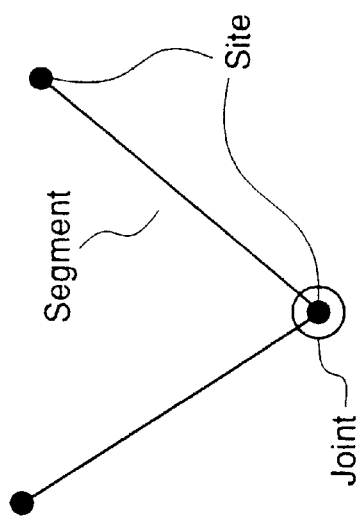
FIG. 5 is a diagram showing a data format of a skeleton structure.

Referring to FIG. 5(*a*), for human elbows, segments correspond to upper arms or forearms, parts called "site" are present at both ends of the segment. For instance, the joints of the elbows are further defined as an upper arm site and a forearm site.

Referring to FIG. 5(*b*), in the definition of a skeleton structure, each part name, e.g. "Neck and NeckBase," is added to segments, sites and joints, as an identifier. Three components of three-dimensional coordinate position "−p" or the angle of rotation "−r" are set to a site. In the coordinate of a site, the origin of a local coordinate is placed at the parent site of each segment. As to the joints, there are set identifiers such as "SkullBase" and hierarchical relationship, i.e., parentage "−c", which indicates that a certain parent site connects to a certain child site. Further, a moving-range "−l" (angle) and the degrees of freedom of rotation (e.g. for "Ball," rotations around X, Y and Z axes).

The motion data defining means 12 sets the motion data of main parts of the skeleton structure set by the skeleton structure defining means 11. The aforementioned main parts signify the skeleton parts required to move. For instance, when it is required to move the whole body, three-dimensional coordinate position or rotation data of the joints of the skeletons contained in the whole body, are given as time series data. The motion data format normally comprise time data such as frame numbers, and entity data. The time data and the entity data are respectively composed of the name of joints, identifiers for distinguishing rotation data or position data, and three elements (compositions of X, Y and Z axes).

The motion element data disassembling means 13 disassembles, as required, motion element data into reference points, motion passage information required for expressing the skeleton movement, based on the motion data stream of time series. The disassembling method will be described later.

The CG animation data transferring means 2 transfers CG animation data in which an initial information is accompanied by motion data of a skeleton structure, from the transmitting end computer to the receiving end computer by using a transmitting program on the transmitting end computer and a receiving program on the receiving end computer. Specifically, according to TCP/IP, the skeleton structure and the motion data compressed by the CG animation data transmitting means 1 are transferred between servers and clients.

The CG animation data receiving means 3 receives CG animation data transferred from the CG animation data transferring means 2, distinguishes the transmitting format of the received CG animation data. For the transmitting format 1, the means 3 interprets the initial information and the motion data of the skeleton structure being transmitted as time series data, to decide the posture of the skeleton structure according to kinematics. For the transmission format II, the means 3 interprets the initial information and the motion data of the skeleton structure in which the connection method of the disassembled basic motions has been added to the disassembled basic motion, to decide the posture of the skeleton structure according to kinematics.

At that time, the skeleton structure defining means 31 receives the human skeleton structure data to be defined by the skeleton structure defining means 11, and then interprets the received skeleton structure data.

The shape data corresponding means 32 associates a certain segment of a skeleton structure as a processing object processed, with a certain part of shape data previously transferred. This shape data signify data relative to skin parts to be attached to the skeletons of a CG character. Normally, the shape data is a polygon stream or a set of mesh data. The polygon stream or the mesh data is classified into, for example, a group corresponding to upper arms and a group corresponding to legs. It is previously defined how the classified data group corresponds to the upper arms or legs of the skeleton structure. Normally, the correspondence between shapes and skeletons is decided by positioning, at the parent site of the segment of the skeleton structure, the origin of a local coordinate system of the segment, and setting how much skin should be attached in which direction from the origin. The direction is designated by positioning vector and orientation vector. The segment of a skeleton is positioned in the center of gravity of a plurality of shape groups and attached to the minimum distance from each shape group.

In order to show shapes naturally, it is necessary to set such that skin does not break at joint parts. This is realized by setting a new shape group called "flexor" for the shape groups of the joint parts, setting, by weighting factor, the influences according to the bending angles from a parent segment and a child segment depending on the bending angles of the joint parts, to deform the shape groups contained in the flexor.

The motion data defining means 33 receives motion data transmitted from the motion data defining means 12 or the motion element data disassembling means 13 and then restores the received motion data as necessary.

The motion element data connecting means 35 connects smoothly basic motions of the motion data restored in the motion data defining means 33, with each other.

The posture deciding means 34 decides the postures of skeletons at an arbitrary time, using the skeleton structure data from the skeleton structure defining means 31, the shape data grouped by skeleton data from the shape data corresponding means 32, and the motion data from the motion data defining means 33. Further, the posture deciding means 34 adds, as necessary, the motion data in which the basic motions transmitted from the motion element data connecting means 35 have smoothly been connected with each other, to decide the postures of the skeletons at an arbitrary time.

The motion connecting means 36 connects the postures of the skeletons decided in the posture deciding means 34.

Description will be given of a method for deciding the posture of a skeleton structure.

When deciding the posture of a skeleton structure shown in FIG. 4 at an arbitrary time (frame), although it depends on motion data format, there is basically employed kinematics method that was primarily developed in the field of robotics engineering(see, for example, *Robot Dynamics and Control* written by Arimoto, published by Asakura-shoten).

In the kinematics method, time variation quantity of the angle data of each joint is given to an initial position of a Joint structure connected by linear chain links to decide joint positions of parents and then those of children, thereby deciding the postures of the linear chains.

In the case of a human skeleton as shown in FIG. 4, it is normally necessary to individually decide the respective postures of five linear chains which comprises the right and left feet tips from the root, the right and left hand tips from the root, and the head top from the root (e.g., the right arm and the right leg). Suppose that data from the motion data defining means 33 is the angle data of the respective joints. Generally, since necessary angle data of the joints in FIG. 4 are all given to the posture deciding means 34, the positions of the respective linear chains are decided uniquely. As discussed above, a method for deciding the positions of skeletons by using an initial state of a skeleton structure and angle data of joints at an arbitrary time, i.e., rotation angle from an initial position in the local coordinate system, is called "forward kinematics method."

In the forward kinematics method, the posture deciding means 34 performs calculations of the initial value data of skeletons input from the skeleton structure defining means 31, in the order of increasing distance from the root. For instance, to parent sites of the skeletons and the lengths of segments shown in FIG. 5, a rotation matrix (3*4 matrix), which depends on the rotation angles of parent sites given by the motion data defining means 33, is acted to decide the positions of child sites. The operation for making the rotation matrix act to the aforesaid parent sites and the lengths of the segments is repeated as many as the number of joints.

As a posture deciding method other than the forward kinematics method, there is inverse kinematics method. In the inverse kinematics method, it is necessary to set a range of calculating in a skeleton structure, i.e., the range of the effect of skeleton movements, which is called "handle." In FIG. 4, a handle is set, for example, from the right nape to the right hand tip. To this handle, time series data of the position of the tip of the handle (the right hand tip in this example) in three-dimensional virtual space is given. Although the position data can be set by the maximum six elements of three-dimensional coordinates (X, Y and Z axes compositions) and rotational angles (rotational compositions around X, Y and Z axes) of the tip, normally, either of the three compositions are separately given to the posture deciding means 34.

When the posture of a skeleton (the range of a hand) is solved from the position of the tip of the handle by employing the inverse kinematics method, but for constraint, plural solutions could be present. That is, the postures of the skeletons in three-dimensional virtual space cannot be decided uniquely. Therefore, it is normally calculated based on an evaluation function (energy minimization) by which the sum of the square of microscopic change quantities of all joint angles contained in a handle becomes a minimum. Specifically, calculated are joint angles employed in the forward kinematics method and an inverse matrix of a determinant expressing the relationship of tip position, which is called "Jacobi matrix" and is decided uniquely. In the inverse matrix, when the number of joints is N, it becomes a matrix of 6*N, wherein 6 denotes the maximum degree of freedom. Since no inverse matrix exists as it is, pseudo Jacobi inverse matrix is calculated by such as sweep method under the aforementioned constraint (see *Robotics* written by Hirose, published by Shokabo).

In the posture deciding means 34, either the inverse kinematics or the forward kinematics is used depending on the use, and, as required, the joint angle decided by kinematics is compared with a set moving range based on the moving range data of an arbitrary joint to be input from the skeleton structure defining means 31, thereby placing restrictions on the postures of joints. After calculating the posture by kinematics, when a certain joint angle exceeds the moving range, there is added conditional judgment processing to be set to the value obtained by the posture calculation.

Thus, the posture of a character having a skeleton structure can be decided by employing the aforementioned kinematics method.

Description will be given of a method for affixing skin to postures of skeletons.

As previously described, in 3DCG, skin data is a polygon group or a free-form surface group. Normally, the modeling of skin shape requires a general 3DCG modeling tool. The output data format of this tool utilizes the standard formats, such as Dxf (the file format of the trade name Auto "CAD", manufactured by AUTODESK Corp.) and Obj (the file format of the trade name "wavefront", manufactured by Silicon Graphics In.).

In the shape data corresponding means 32, a polygon group is associated to a certain segment of a skeleton structure defined in the skeleton structure defining means 31. For instance, when the shape group of human upper arms corresponds to the segment of upper arms in skeletons, the origin (e.g., the position of center of gravity) of a modeling coordinate of the shape group is matched with the origin of a parent site coordinate of the segment, and then the fine adjustment of location relationship is performed using offset from the matched point (three compositions in the directions of X, Y and Z axes) and the scale of the shape (enlargement ratio in the directions of X, Y and Z axes).

By deciding the postures of the skeletons using kinematics method, the position and direction of a parent site of a target segment are decided. Therefore, by allowing the moving rotation matrix as described above to directly act on shape data of the group corresponding to each segment (top coordinate of the polygon), skin moves in association with the motions of skeletons.

In the above described manner, the animation of a CG character having a basic skeleton structure is created.

In the foregoing example, the motion data is angle data of joints in the forward kinematics or position data of a tip portion in the inverse kinematics. Further, time series data of the angle data of the joints and the position data of the tip portion are required to subsequently input from the motion data defining means 33.

Generally, in a transmitting/receiving system of the CG animation data that is connected to internet, as shown in FIG. 1, it is necessary to minimize communication traffic in the CG animation data transferring means 1.

Description will be given of a compression method of motion data.

It is necessary that compression rate can be controlled hierarchically according to plot capability of transmitting/receiving end machines.

Figure 6:
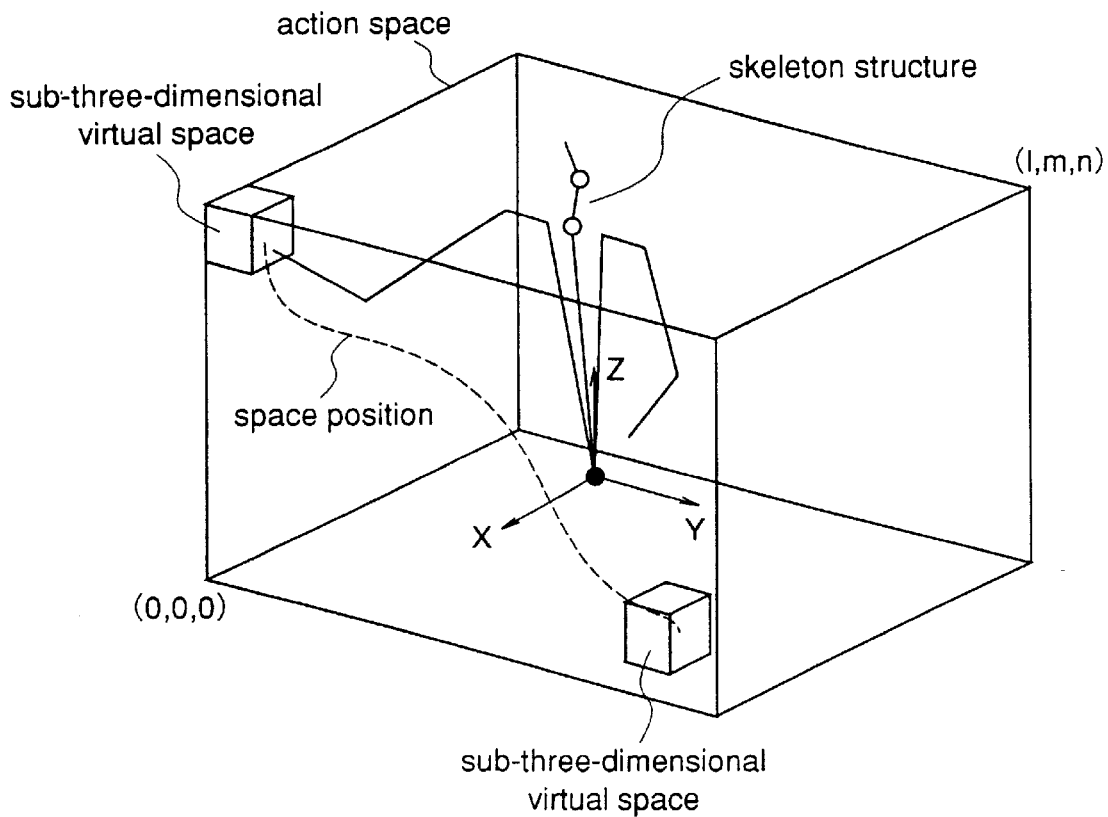
FIG. 6 is a diagram for explaining a process for subdividing method of a skeleton structure motions.

Referring to FIG. 6, CG character motion data is decided by information (i) the motions of joints of a skeleton structure; and (ii) the positions of the entire body in three-dimensional virtual space, and direction data. Hereinafter, the former will be called "local information" and the latter will be called "world information."

In normal CG character animations, the world information is defined as root information of the skeleton structure shown in FIG. 4, and the local information is defined as joint information. Firstly, a three-dimensional virtual space surrounding a moving range of a CG character as shown in FIG. 6, is estimated. The reference coordinate of the three-dimensional virtual space is matched with the root position of the skeleton structure (the position of a human spin base in FIG. 6), and then the origin of a local coordinate system is set. With respect to the origin of the local coordinate system, a virtual action space in the directions of X, Y and Z axes is set. The whole size of the virtual action space is decided by setting the dimensions in the directions of X, Y and Z axes. The move of the virtual action space in the world coordinate system in association with the move of the body can be defined by the translating trace and rotational matrix of the character. The virtual action range will be rotated or removed according to the move of the CG character, i.e., world information. Qualitatively, the virtual action range is the maximum range in which the hands and legs of a CG character can move in the local coordinate system. Although a rectangular parallelopiped is exemplified as a virtual action space in FIG. 6, a sphere centered with respect to a CG character may be selected. In this case, it is preferable that a division as described later is given in a polar coordinate system.

Secondly, sub-three-dimensional virtual spaces that divide the three-dimensional virtual space are estimated. The sub-three-dimensional virtual spaces are for uniformly subdividing the virtual action space, and its size decides the number of quantizations by dividing pitches of dx, dy and dz in the directions of X, Y and Z axes in the local coordinate system, or the number of division (l, m, n) in the direction of X, Y and Z axes.

In setting the motion of a CG character in three-dimensional virtual space, it is required to set joint positions or the position of a tip position of a skeleton structure. The position is defined by an identification number or a coordinate position of a sub-three-dimensional virtual space. By setting the dividing pitch of the sub-three-dimensional space greater, the quantization level of each joint position or a tip position of a skeleton structure will be lowered, resulting in reduced data quantity.

Figure 7:
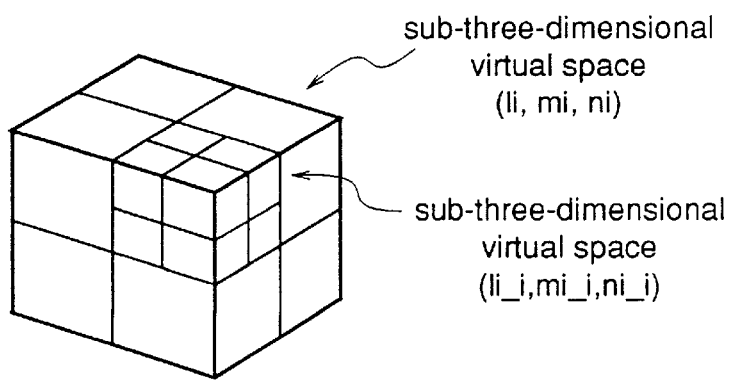
FIG. 7 is a diagram for explaining sub-three-dimensional virtual spaces of divided motions.
Figure 8:
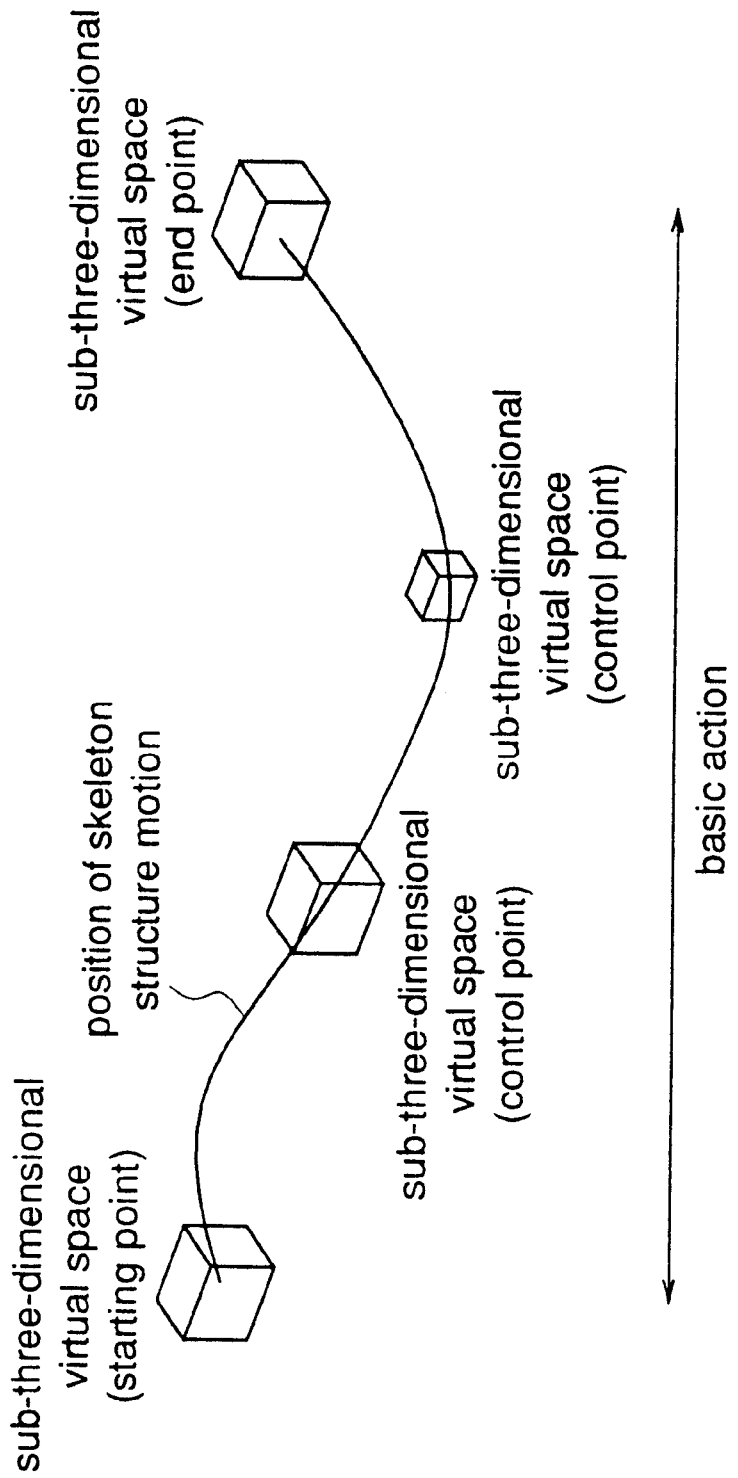
FIG. 8 is a diagram for explaining how motion position is restored from the sub-three-dimensional virtual spaces of the divided motions.

The sub-three-dimensional space is further divided hierarchically and then synthesized depending on hardware of the transmitting/receiving ends or the performance of a transferring system, as shown in FIG. 7. To code a continuous motion position of a CG character in a three-dimensional virtual space, the control points of the motion in three-dimensional virtual space shown in FIG. 8 are designated by a sub-three-dimensional virtual space. Requite information for reproducing motion include the position (or identification number) of a sub-three-dimensional virtual space at a starting point of the motion, the position (or identification number) of a sub-three-dimensional virtual space at the end point, and information of interpolation method, e.g., linear interpolation and spline interpolation, between the starting and end points of the motion. As increasing the information of the control points shown in FIG. 8, the motion is reproduced smoothly, which, however, increases the data quantity. When the identification number is given, the conversion into a coordinate in three-dimensional virtual space at the receiving end, is performed by using, for example, the position of gravitational center of a sub-three-dimension virtual space and the relative position from the origin of a local coordinate. In this case, there occurs a quantizing error of the size of one sub-three-dimensional virtual space.

The flow of the aforementioned data in the transmitting/receiving system of the skeleton data of the CG character shown in FIG. 1 will be summarized. Firstly, in the motion element data disassembling means 13, the position and the moving rotation matrix expressing the direction (world information) in the world coordinate system in three-dimensional virtual space, the size of a virtual action space as shown in FIG. 6, and the dividing pitches (dx, dy, dz) into sub-three-dimensional virtual spaces are transferred to a target CG character. Then, the positions or the identification number of sub-three-dimensional virtual spaces at starting and end points of three-dimensional position in which the skeletons of arms and legs move, the sub-space position of the-control points or the control point information, and a method of connecting the starting and end points of the three-dimensional position are transferred as motion data, by the unit of an arm and a leg of a CG character, as required. In the motion data element connecting means 35 at the receiving end, the transferred data is interpreted (restored), and the three-dimensional position of the CG character shown in FIG. 6 is then interpolated to reproduce the motion of the CG character.

For simplification, the above description is-provided on a method in which only the position of the tip portion is set. Likewise, when a posture is decided utilizing the forward kinematics in the posture deciding means 34, angle information obtained from the control positions of all the joints of necessary skeletons may be transferred as information of sub-three-dimensional virtual spaces.

Figure 9:
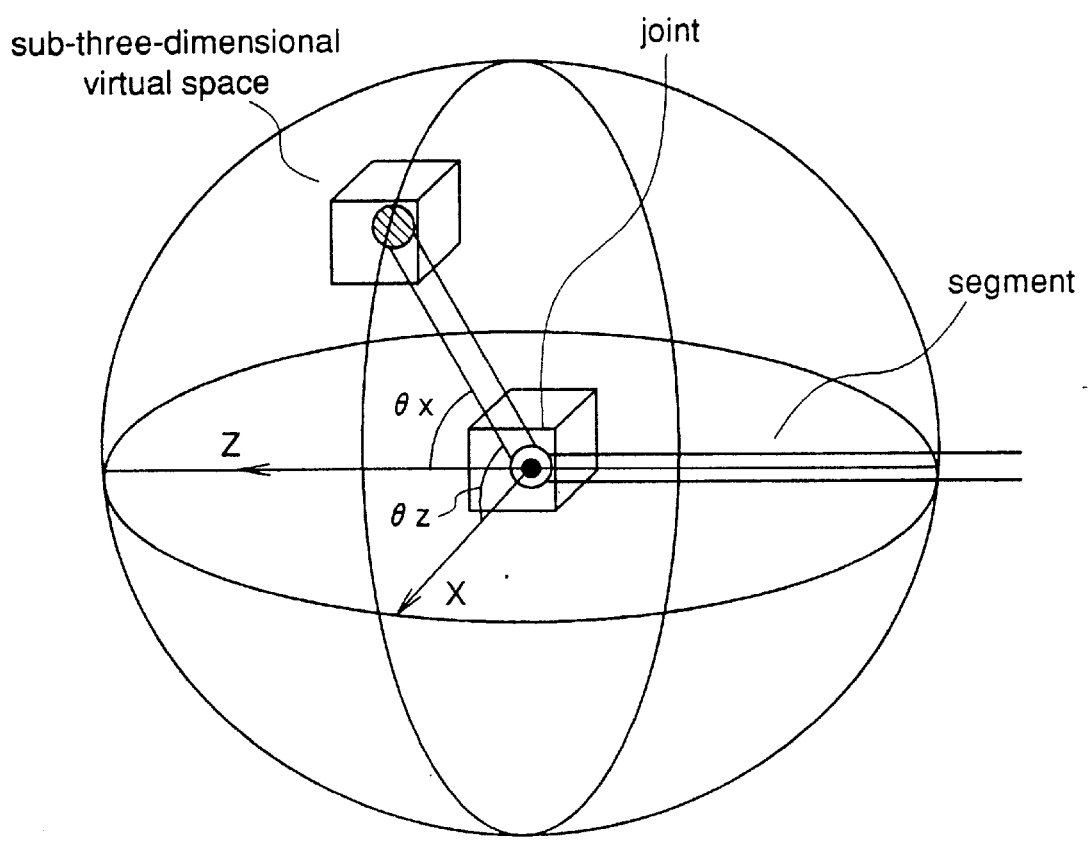
FIG. 9 is a diagram for explaining a process for changing into a joint angle when given sub-three-dimensional virtual spaces.

FIG. 9 shows a method for obtaining joint angle data at the transmitting or receiving end when sub-three-dimensional virtual spaces are given to the posture deciding means 34.

Referring to FIG. 9, an initial position of a joint position (the center position of a sphere in FIG. 9) is set in the skeleton structure defining means 11 and the skeleton structure defining means 31. When a position of a sub-three-dimensional space at a certain time, or an identification number is given to the posture defining means 34, the gravitational position coordinate of the sub-three-dimensional space can be calculated. Based on the position in the sub-three-dimensional virtual space or an identification number, the dimension of a sub-three-dimensional a virtual space, and the length of a segment that has been known, the rotational angles ($\theta x$, $\theta y$, $\theta z$) around the respective axes in the local coordinate system are calculated. In this case, the order of the rotations (e.g., X–Y–Z) should be previously decided.

When a posture is decided utilizing the inverse kinematics in the posture deciding means 34, in the CG animation data transmitting means 1, handle information of a skeleton structure and the position information of the tip position of skeletons are transferred from the motion element data disassembling means 13.

In the foregoing description, information on distortions of skeletons, i.e., the rotations around Z axis in the local coordinate system, is not defined-exactly. In a case where the degree of freedom of a joint is "Ball" in the definition of joints, i.e., joint information in FIG. 5(b), even when it is rotatable in three axes of X, Y and Z, the rotation around Z axis is disregarded if distortion is restricted. In human being and the like, however, distortions of joints of such as hip, neck and wrists significantly affect the posture. Particularly in a CG character, it is necessary to precisely express as to whether wrists are turned up. In this case, distortion information, i.e., the rotation angle around Z axis, should be added to the sub-three-dimensional virtual space information, the resulting information is then transmitted/received. For instance, in the illustration in FIG. 11(a), distortion angle $\theta_0$ of a wrist at time $t_0$ and distortion angle $\theta_1$ at time $t_1$ are transmitted/received and, among joint angles of skeletons decided in the posture deciding means 34, only portions requiring distortion are replaced with angle data subjected to the interpolation between $\theta_0$ and $\theta_1$.

Description will be given of a method for connecting basic motions (e.g., a continuous motion such as "to raise the right hand", and "to wave a hand") with each other. As basic motions of a CG character, the following two examples will be illustrated: (A) motion in which the right hand passes from a virtual action space at the below left of the body to a virtual action space in the center of the body, and then moves to a virtual action space at the upper right; and (B) motion in which a hand moves from a virtual action space at the upper right to a vertical action space in the front of the body.

Figure 11:
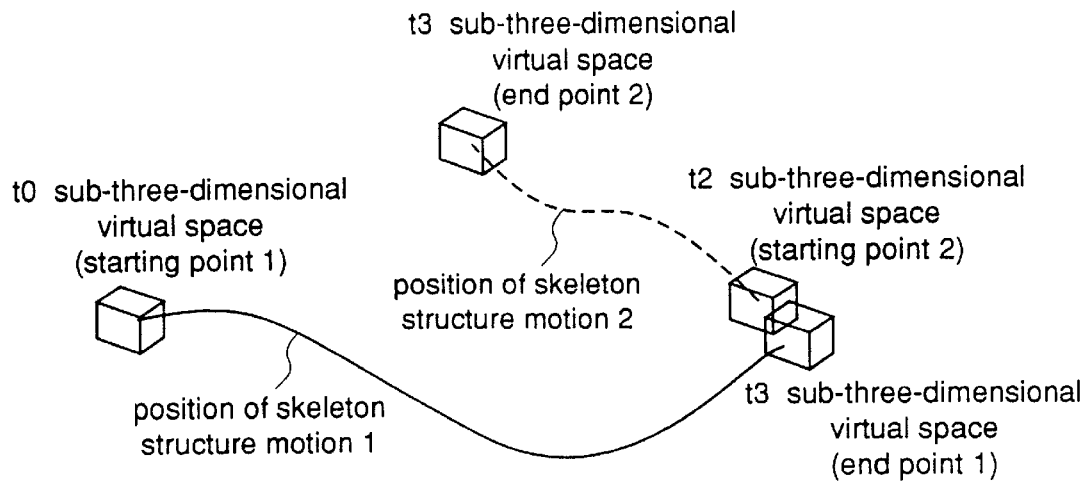
FIGS. 11(a) and 11(b) are diagrams for explaining connections between basic motions.
Figure 11:
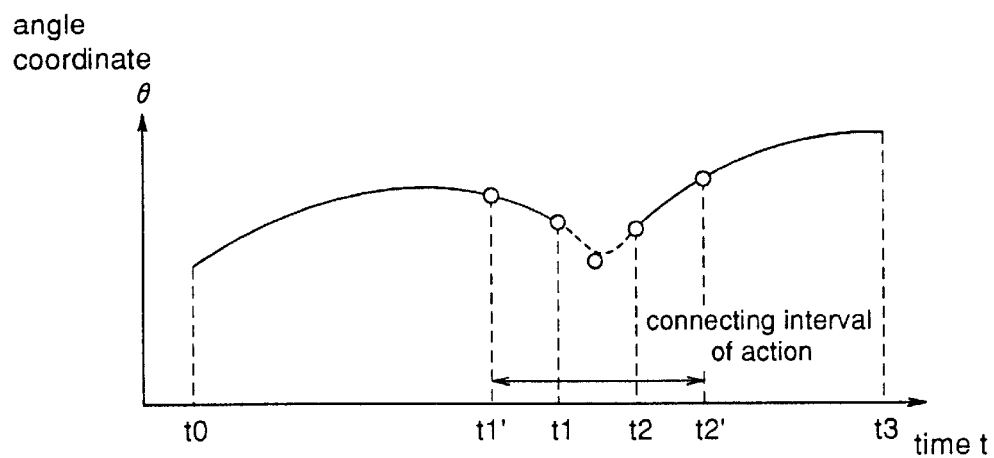

FIG. 11(a) is a diagram for explaining a connection of two basic motions.

Referring to FIG. 11(a), it is provided that the motion from time t0 to t1 corresponds to the motion (A), and the motion from time t2 to t3 corresponds to the motion (B). The motion element data disassembling means 12 disassembles the motion into virtual action space information and then transfers sub-three-dimensional virtual space information of the starting and end points, and, as required, sub-three-dimensional virtual space information of control points between the starting and end points, together with the interpolation method. In the CG animation data receiving means 3, the motion element connecting means 35 interprets the sub-three-dimensional virtual spaces to restore the position information of each basic action. Further in the motion element connecting means 35, the basic actions (A) and (B) are connected with each other.

FIG. 11(b) shows a state in which the normal basic actions are connected with each other on the basis of time region.

Referring to FIG. 11(b), the end point position of the basic action (A) can be restored from the action space information at time t1. The graph of FIG. 11(b) shows a case where the restored basic actions are converted into the position of the end site of the right hand joint (the tip of the right hand) or joint angle data. Similarly, the angle of the right hand tip or the coordinate value at time t2 can be restored from the action space position at time t2. As connection information for connecting these basic actions, it is necessary to set information on how much it goes in the negative time direction of the basic action (A) (a value in the negative time direction, e.g., t1') and information on how much it goes in the positive time direction of the basic action (B) (a value in the positive time direction, e.g., t2'). Such a set value may have a fixed value as default at the transmitting/receiving end. Based on these information, interpolation processing is performed using the coordinate values of the right hand tip at times t1', t1, t2 and t2' shown in FIG. 11(b). Although values indicated by circles in FIG. 11(b) generally have three compositions of X, Y and Z axes, one composition alone is illustrated here for the sake of simplification.

As a method for interpolating these points, information on such as linear interpolation or spline interpolation is preset at transmitting/receiving ends. For a more smooth connection, sub-three-dimensional virtual space information serving as interpolation information is transferred between times t1 and t2 (see a point between times t1 and t2 in FIG. 11(b).

The above illustration refers to a case in which the posture of skeletons are decided in the posture deciding means 34 utilizing the inverse kinematics method. In a case utilizing the forward kinematics, each joint information is given to the posture deciding means 34, but the connection of the basic actions is performed on the same principle as the inverse kinematics method.

Utilizing the aforesaid methods, by connecting a plurality of basic actions with one another based on a plurality of basic actions transferred previously and merely transmitting a new virtual action space information and the interpolation information, a new action whose basic action has been changed can be created with considerably less data quantity.

Description will be given of a method for creating control points information that serve as staring and end points or a key of the aforementioned basic action.

The basic action of a CG character in a three-dimensional virtual space is classified, as discussed above, into the world information, i.e., in which part of three-dimensional virtual space and along which position a target CG character moves; and the local information, i.e., which posture (position) the hands and legs of a target CG character takes at a certain time on the position of the CG character. The former is defined by translation quantities (Xtrans, Ytrans, Ztrans) of the root of the skeleton structure shown in FIG. 4 at an arbitrary time and the orientations (Xrot, Yrot, Zrot). The latter is defined by the rotations (Xrot, Yrot, Zrot) of each joint or the tip portion, or three-dimensional coordinates (Xtrans, Ytrans, Ztrans). These information are sent from the transmitting system to the receiving system as time series data or the aforementioned virtual action space information.

In setting the basic action itself, normally used is technique called "motion capture." A method for creating action data utilizing the motion capture will be discussed.

In the motion capture technique, the picture of a model whose joints are equipped with a marker reflecting light is taken by a plurality of cameras while being subjected to a desired motion. Based on the secondary picture image of the marker taken by two or more cameras, the three-dimensional coordinates of the marker or the angle data obtained by associating the skeleton structure is calculated (see for example Japanese Patent Application No. 7-312005(1995)). The motion of a CG character subjected to the motion capture is obtained as angle data (time series) of joints of the skeleton structure shown in FIG. 4. Such data correspond to the position 1 of the movement from time t0 to t1, or the position 2 of the movement from time t2 to t3.

It is a basic method for transmitting/receiving motion data that the angle data of each joint of the skeleton structure is sent, as a basic action, transmitted from the motion data defining means 12 to the CG animation data transferring means 2 as time series data, to be interpreted in the motion data defining means 33.

In the case where the motion data quantity is desired to be reduced, there is a method in which the control points information on a position is sampled and then the sampled information is transmitted/received together with its connection method.

In the case where the transmitting/receiving data is required to be reused, the data should be disassembled into a virtual action space data shown in FIG. 6. In this case, based on the position data subjected to the motion capture, the motion element data disassembling means 13 quantizes (vector quantization) into the virtual action space of the CG character in FIG. 6, and then disassembles into the virtual action space data positions and identification number. The motion element data connecting means 35 restores, from the received virtual action space data, the motion position subjected to the motion capture by utilizing the connection method information.

Brief description will be given of a method for creating motion data without using the motion capture and the like.

The skeleton structure of the CG character in FIG. 6 and a virtual action space are set. An initial state of the CG character is as shown in FIGS. 10(a) and 10(b). The virtual action space is divide into sub-three-dimensional virtual spaces and the obtained sub-three-dimensional virtual spaces are then designated by identification number and the like.

Referring to FIG. 12 illustrating a simple setting of the right hand posture, the starting position of the right hand tip is decided. For instance, when the staring point is the right forward of the face, the number of a sub-three-dimensional virtual space in the neighborhood of the right forward of the face is set (STEP 1). The result is displayed by deciding the posture of the right hand utilizing such as the inverse kinematics method. In this case, kinematic and display system are required as a simple browser. When the position of the right hand does not agree with the desired position, the step number of a sub-three-dimensional virtual space of the direction of X, Y and Z axes that are required to be removed, i.e., the local coordinate system, from the present block number or position, thereby setting a new sub-three-dimensional virtual space (STEP 2). By repeating STEP 2, the desired position can be set. The advantage of this designation method is that a rough position can be set in a manner in which a person arranges the action, such as "a little right" and "a little rear." Such a designation is set with respect to the sub-three-dimensional virtual space of necessary starting position, end position and the control points (STEP n, STEP n+1, . . . ), The forgoing description was primarily given of the setting of skeleton motions. Actual requirement as a CG character is skin information bound to the aforementioned posture of the skeletons. As previously discussed, the segments of skin shape and skeletons can be assigned by sharing the local coordinate positions. In the kinematics method, it is necessary for a skeleton to be set to a portion that is required to move. Normally used hierarchy relations of skeletons is shown in FIG. 4 or FIG. 10. In the cases where the shape of human finger tips are desired to be set, e.g., an opened hand and a bent finger, the skeleton of the fingers may be defined in the same manner. However, a mere definition of-the skeletons of the fingers will increase data quantity.

As a method for reducing the data quantity, one in which the shape of a hand is fixed and a desired shape data is replaced as required, will be discussed. Firstly, as shape data to be bound to the joints of the right and left hands of the skeleton structure in FIG. 4, shapes in which the hand is for example opened or grasped are previously prepared. As shown in FIG. 11(b), when the motion of the right hand is given, the motion element data disassembling means 13 adds information on distortion and the kind of the shape data to be bound to the wrist and then transfers that information together with the sub-three-dimensional virtual space information. The motion element data connecting means 35 restores the position of the motion using the sub-three-dimensional virtual space information and, at the same time, judges the distortion of the wrist and the shape to be bound to the wrist. Base on the judgment, the display of the results are switched, enabling to precisely reproduce the shape of the hand tip.

Description will be given of a method for representing expressions that is significant in reproducing a CG character.

For a real representation of expressions, it is possible to bind a head shape to the joint that corresponds to the neck of the hierarchy shown in FIG. 4, but it is difficult to reproduce the expressions of such as "being laughing" "being angry." Therefore, expressions is treated by a method for mapping a real moving picture to a face shape.

Referring to FIGS. 10(a) and 10(b), when performing mapping, the shape of a head is typically sphere or cylinder and, as required, shape data reproducing the irregularity of a face is employed. To this shape data, the mapping coordinate or the mapping method in which the projection is taken into consideration is set. Further, taking into consideration the cases where the neck will rotate in the directions of right, left and the like, there are prepared moving picture streams, i.e., MPEG2. (Motion Picture Experts Group phase 2) being compressed image, of expressions when a human face is viewed from a plurality of camera positions, which is normally along a circle surrounding the face. When the direction of the neck is decided, it is determined from which moving picture stream the mapping data (which depend on the viewpoint) of the expressions is selected and, as required, from plural moving picture streams, the corresponding pixels of image data of corresponding time based on a plurality of motion picture stream are weighed from an angle of view point. For instance, the viewpoint observing a CG character is present between the points A and B shown in FIG. 10(b), A and B are selected as moving picture stream data, to decide the weight, which is proportional to the difference, depending on the gap in angles when the center of gravity of the character is viewed from the viewpoints of A, B and a viewpoint.

The CG animation data transmitting means 1 calls for a mechanism for transferring moving picture streams of expressions compressed by for example MPEG2, and camera positions. The CG animation data receiving means 2 calls for a mechanism in which the compressed moving picture streams thus transferred is restored and then judged to which viewpoint an image belongs, depending on the camera positions, followed by mapping. For further details of the method for mapping moving pictures, see *Foley & Van Dam et al., Computer Graphics Principles and Practice II*, Addison Wesley.

FIG. 13 illustrates an example of script notation of motion with respect to three handles of the right hand, the left hand and the head.

Referring to FIG. 13, the numbers of sub-three-dimensional virtual spaces of starting, end and control points are set as position information, and a real reproducing time is transferred as addition information. In this example, spline is designated as interpolation method.

Figure 14:
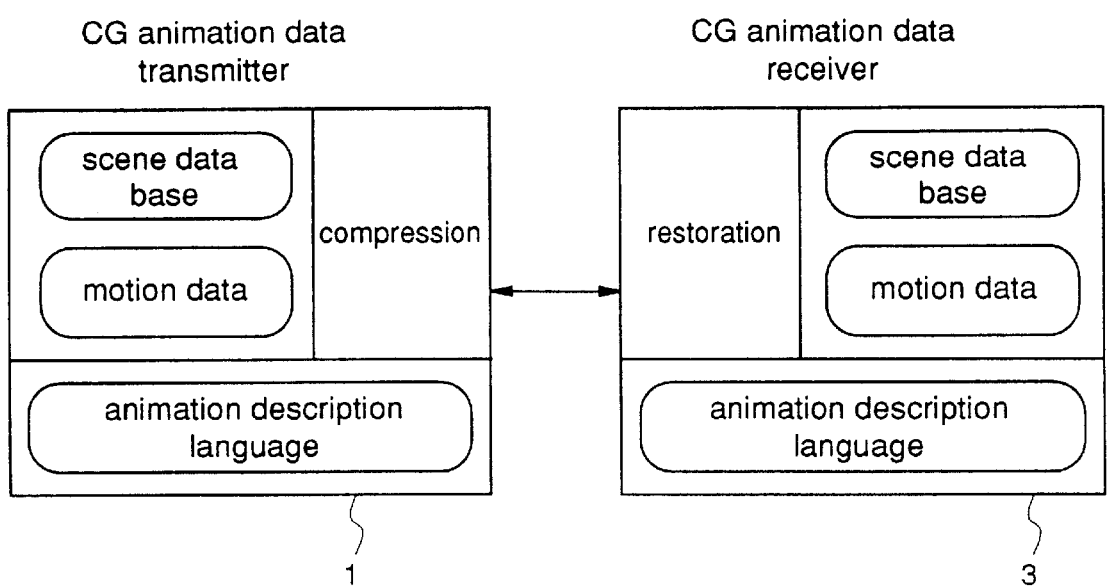
FIG. 14 is a diagram showing a process for transmitting/receiving motion data of a CG skeleton structure.

FIG. 14 illustrates an example of a method for transmitting/receiving motion data of a CG skeleton structure.

Referring to FIG. 14, the transmitting/receiving of the substance of the motion data represented in a sub-three-dimensional virtual space and the description language of the motion as shown in FIG. 13, between the CG animation data transmitting means 1 and the CG animation data transferring means 2, realizes the transmitting/receiving of CG animation data without depending on hardware, e.g., various calculations, performances of such as rendering, and OS (operating system).

Brief description will be given of a method for performing collision check between two CG characters when a plurality of CG characters exist.

As shown in FIG. 6, one of the advantages of representing motion in a sub-three-dimensional virtual space is to simplify the calculation of the collision check. For instance, when it is roughly checked whether one arm of a character collides one arm of the other character, firstly, the boundary of segments contained in a target arm of either character is estimated. Suppose that the boundary is a rectangular parallelopiped that is decided by parent and child sites of the arm of the skeleton structure shown in FIG. 4. The base area of the rectangular parallelopiped is decided by the size of skin. That of human being is normally a fixed value according to physique. To check the collision between the boundary and the sub-three-dimensional virtual space (rectangular parallelopiped) of the other character, enables a simple and rough check. When required a further detailed check, the collision check of shape data contained in the above boundary (all the tops of polygon groups) may be performed. The collision check in the sub-three-dimensional virtual space, i.e., inner and outer checks between the boundary and a target point, realizes a great simplification (high speed processing) of the calculation of collision check.

What is claimed is:

1. A transmitter of three-dimensional skeleton structure motions in which motion data of a skeleton structure in three-dimensional computer graphics (CG) is transmitted from a transmitting end to a receiving end and, based on the transmitted skeleton structure motion data, to create animation at the receiving end, the transmitter comprising:
   (1) means for disassembling the motion data of the skeleton structure into element data characterizing the motions in three-dimensional virtual space and transmitting the element data as time series data in which the disassembled element data is accompanied by connection methods thereto, and for transmitting an initial information as CG animation data, the initial information including hierarchy data for defining a hierarchical relationship of the skeleton structure, an initial state of the hierarchy data, constraint of the joints of skeletons, shape data to be attached to the skeletons, and data relative to the attachment to the skeleton structure; and
   (2) transferring means for transferring the CG animation data from a transmitting end computer to a receiving end computer.

2. A recording medium having recorded thereon a transmitting program of three-dimensional skeleton structure motions for transmitting motion data of a skeleton structure in three-dimensional computer graphics (CG) from a transmitting end to a receiving end and, based on the transmitted skeleton structure motion data, for creating animation at the receiving end, the transmitting program comprising:
   (1) means for disassembling the motion data of the skeleton structure into element data characterizing the motions in three-dimensional virtual space and transmitting the element data as time series data in which the disassembled element data is accompanied by connection methods thereto, and for transmitting an initial information as CG animation data, the initial information including hierarchy data for defining a hierarchical relationship of the skeleton structure, an initial state of the hierarchy data, constraint of the joints of skeletons, shape data to be attached to the skeletons, and data relative to the attachment to the skeleton structure; and
   (2) means for transferring the CG animation data from a transmitting end computer to a receiving end computer.

3. The transmitter of claim 1, wherein:
the transmitter is further for (1) deciding either of transmitting formats: (a) the motion data of the skeleton structure is added to an initial information and then transmitted as time series data; or (b) the motion data of the skeleton structure is disassembled into element data characterizing the motions in three-dimensional virtual space and then transmitted as data in which the disassembled element data is accompanied by connection methods thereto; and (2) for transmitting the initial information to which the motion data of the skeleton structure is added based on the decided transmission format.

4. The transmitter of claim 3, the transmitter including:
   (i) means for defining the skeleton structure and then transmitting the defined skeleton structure data as initial information; and
   (ii) means in which based on a position of a predecided part motions of the skeleton structure in three-dimensional virtual space, the motion data is disassembled into representative element data, to which data a connection method thereof is then added, followed by transmitting.

5. The transmitter of claim 3, the transmitter including:
   (i) means for transmitting the skeleton structure and the motion information of the skeleton structure; and
   (ii) means for compressing moving picture image data stream to be attached to a part of the skeleton structure, adding a method of altering the moving picture image depending on the skeleton structure motions, to the compressed moving picture image data stream, followed by transmitting.

6. The transmitter of claim 3, the transmitter including:
   (i) means for setting a local coordinate system to a primary position of a CG character as a transmitting object; and
   (ii) means for estimating a three-dimensional virtual space covering a moving range of the character to which the local coordinate system has set; dividing the three-dimensional virtual space into sub-three-dimensional virtual spaces similar to the three-dimensional virtual space; hierarchically dividing the sub-three-dimensional virtual space; and displaying the position of a target portion of the skeleton structure of the character in the three-dimensional virtual space, based on the dimension and dividing size of the sub-three-dimensional virtual spaces, rotation matrix in the local coordinate system in response to the movement of the character, and information relative to the positions of the hierarchized sub-three-dimensional virtual spaces, to decide element data relative to the motion data of the skeleton structure in the three-dimensional virtual space.

7. The transmitter of claim 3, the transmitter including:
(i) means for setting a local coordinate system to a primary position of a CG character as a transmitting object; and
(ii) means for estimating a three-dimensional virtual space covering a moving range of the character to which the local coordinate system has set; dividing the three-dimensional virtual space into sub-three-dimensional virtual spaces similar to the three-dimensional virtual space; hierarchically dividing the sub-three-dimensional virtual space; and displaying the position of a target portion of the skeleton structure of the character in the three-dimensional virtual space, based on the dimension and dividing size of the sub-three-dimensional virtual spaces, rotation matrix in the local coordinate system in response to the movement of the character, and information relative to the positions of the hierarchized sub-three-dimensional virtual spaces; and
(iii) means for adding interpolation information for spatially interpolating blocks being isolated from each other, to animation data of the CG character under the conditions that target portions of the skeleton structure of the character are isolated from each other, to decide element data relative to the motion data of the skeleton structure in the three-dimensional virtual space.

8. The transmitter of claim 3, the transmitter including:
(i) means for setting a local coordinate system to a primary position of a CG character as a transmitting object; and
(ii) means for estimating a three-dimensional virtual space covering a moving range of the character, dividing the three-dimensional virtual space into sub-three-dimensional virtual spaces similar to the three-dimensional virtual space, hierarchically dividing the sub-three-dimensional virtual space, and displaying the positions of target portions of the skeleton structure of the character in the three-dimensional virtual space, based on the dimension and dividing size of the sub-three-dimensional virtual space, movement with rotation matrix in the local coordinate system in response to the movement of the CG character, and information relative to the position of the hierarchized sub-three-dimensional virtual spaces; and
(iii) means for adding three-dimensional angle information of an arbitrarily designated part in the skeleton structure of the CG character to the CG animation data, to decide element date with respect to the motion data of the skeleton structure in the three-dimensional virtual space.

9. A transmitter of claim 3, the transmitter including:
(i) means for designating the position of a CG character as a transmitting object in three-dimensional virtual space, based on either of information relative to positions: (a) a three-dimensional virtual space covering a moving range of the character; and (b) sub-three-dimensional virtual spaces obtained by dividing the three-dimensional virtual space and
(ii) means for altering the position of the character in the three-dimensional virtual space by adding information relative to the position of a sub-three-dimensional virtual space adjacent to another sub-three-dimensional space, under the conditions that position of the character in the three-dimensional virtual space is altered, to set the moving points of the skeleton structure to be transmitted in the virtual space.

10. A transmitter of three-dimensional skeleton structure motions by which motion data of a skeleton structure in three-dimensional computer graphics (CG) is transmitted from a transmitting end to a receiving end and, based on the transmitted skeleton structure motion data, to create animation at the receiving end, the transmitter comprising:
(1) means for disassembling the motion data of the skeleton structure into element data characterizing the motions in three-dimensional virtual space and transmitting the element as time series data in which the disassembled element data is accompanied by connection methods thereto, and for transmitting an initial information as CG animation data, the initial information including hierarchy data for defining hierarchical relationship of the skeleton structure, an initial state of the hierarchy data, constraint of the joints of skeletons, shape data to be attached to the skeletons, data relative to the attachment to the skeleton structure, a motion picture data stream for a motion picture mapping to a part of the shape data, and a mapping method; and
(2) transferring means for transferring the CG animation data from a transmitting end computer to a receiving end computer.

11. A recording medium having recorded thereon a transmitting program of three-dimensional skeleton structure motions for transmitting motion data of a skeleton structure in three-dimensional computer graphics (CG) from a transmitting end to a receiving end and, based on the transmitted skeleton structure motion data, for creating animation at the receiving end, the transmitting program comprising:
(1) means for disassembling the motion data of the skeleton structure into element data characterizing the motions in three-dimensional virtual space and transmitting the element as time series data in which the disassembled element data is accompanied by connection methods thereto, and for transmitting an initial information as CG animation data, the initial information including hierarchy data for defining hierarchical relationship of the skeleton structure, an initial state of the hierarchy data, constraint of the joints of skeletons, shape data to be attached to the skeletons, data relative to the attachment to the skeleton structure, a motion picture data stream for a motion picture mapping to a part of the shape data, and a mapping method; and
(2) means for transferring the CG animation data from a transmitting end computer to a receiving end computer.

12. The transmitter of claim 10, wherein:
the transmitter is further for (1) deciding either of transmitting formats: (a) the motion data of the skeleton structure is added to an initial information and then transmitted as time series data; or (b) the motion data of the skeleton structure is disassembled into element data characterizing the motions in three-dimensional virtual space and then (2) for transmitting as data in which the disassembled element data is accompanied by connection methods thereto, and then transmitting the initial information to which the motion data of the skeleton structure is added based on the decided transmission format.

13. The transmitter of claim 12, the transmitter including:
(i) means for transmitting the skeleton structure and the motion information of the skeleton structure; and
(ii) means for compressing moving picture image data stream to be attached to a part of the skeleton structure, adding a method of altering the moving picture image depending on the skeleton structure motions, to the compressed moving picture image data stream, followed by transmitting.

14. The transmitter of claim 12, the transmitter including:
(i) means for transmitting the skeleton structure and the motion information of the skeleton structure; and
(ii) means for compressing moving picture image data stream to be attached to a part of the skeleton structure, adding a method of altering the moving picture image depending on the skeleton structure motions, to the compressed moving picture image data stream, followed by transmitting.

15. The transmitter of claim 12, the transmitter including:
(i) means for setting a local coordinate system to a primary position of a CG character as a transmitting object; and
(ii) means for estimating a three-dimensional virtual space covering a moving range of the character to which the local coordinate system has set; dividing the three-dimensional virtual space into sub-three-dimensional virtual spaces similar to the three-dimensional virtual space; hierarchically dividing the sub-three-dimensional virtual space; and displaying the position of a target portion of the skeleton structure of the character in the three-dimensional virtual space, based on the dimension and dividing size of the sub-three-dimensional virtual spaces, rotation matrix in the local coordinate system in response to the movement of the character, and information relative to the positions of the hierarchized sub-three-dimensional virtual spaces, to decide element data relative to the motion data of the skeleton structure in the three-dimensional virtual space.

16. The transmitter of claim 12, the transmitter including:
(i) means for setting a local coordinate system to a primary position of a CG character as a transmitting object;
(ii) means for estimating a three-dimensional virtual space covering a moving range of the character to which the local coordinate system has set; dividing the three-dimensional virtual space into sub-three-dimensional virtual spaces similar to the three-dimensional virtual space; hierarchically dividing the sub-three-dimensional virtual space; and displaying the position of a target portion of the skeleton structure of the character in the three-dimensional virtual space, based on the dimension and dividing size of the sub-three-dimensional virtual spaces, rotation matrix in the local coordinate system in response to the movement of the character, and information relative to the positions of the hierarchized sub-three-dimensional virtual spaces, to decide element data relative to the motion data of the skeleton structure in the three-dimensional virtual space; and
(iii) means for adding three-dimensional angle information of an arbitrarily designated part in the skeleton structure of the CG character to the CG animation, to decide element data with respect to the motion data of the skeleton structure in the three-dimensional virtual space.

17. The transmitter of claim 12, the transmitter including:
(i) means for setting a local coordinate system to a primary position of a CG character as a transmitting object; and
(ii) means for estimating a three-dimensional virtual space covering a moving range of the character to which the local coordinate system has set; dividing the three-dimensional virtual space into sub-three-dimensional virtual spaces similar to the three-dimensional virtual space; hierarchically dividing the sub-three-dimensional virtual space; and displaying the position of a target portion of the skeleton structure of the character in the three-dimensional virtual space, based on the dimension and dividing size of the sub-three-dimensional virtual spaces, rotation matrix in the local coordinate system in response to the movement of the character, and information relative to the positions of the hierarchized sub-three-dimensional virtual spaces, to decide element data relative to the motion data of the skeleton structure in the three-dimensional virtual space.

18. The transmitter of claim 12, the transmitter including:
(i) means for designating the position of a CG character as a transmitting object in three-dimensional virtual space, based on either of information relative to positions: (a) a three-dimensional virtual space covering a moving range of the character; and (b) sub-three-dimensional virtual spaces obtained by dividing the three-dimensional virtual space; and
(ii) means for altering the position of the character in the three-dimensional virtual space by adding information relative to the position of a sub-three-dimensional virtual space adjacent to another sub-three-dimensional virtual space, under the conditions that position of the character in the three-dimensional virtual space is altered, to set the moving points of the skeleton structure to be transmitted in the three-dimensional virtual space.

19. A receiver of three-dimensional skeleton structure motions in which data of a skeleton structure in three-dimensional computer graphics (CG) is transmitted from a transmitting end to a receiving end and, based on the transmitted skeleton structure motion data, to create animation at the receiving end, comprising:
receiving means for receiving the CG animation data from the transmitting end and, for a first format, the initial information and the time series data is interpreted to decide the posture of the skeleton structure according to kinematics and, for a second format, the initial information and the data in which the disassembled element data is accompanied by the connection methods thereto is interpreted to decide the posture of the skeleton structure according to kinematics.

20. A recording medium having recorded thereon a receiving program of three-dimensional skeleton structure motions for receiving data of a skeleton structure in three-dimensional computer graphics (CG) transmitted from a transmitting end to a receiving end and, based on the transmitted skeleton structure motion data, for creating animation at the receiving end, the receiving program comprising:
means for receiving CG animation data from the transmitting end and, for a first format, initial information and time series data is interpreted to decide a posture of the skeleton structure according to kinematics and, for second format, initial information and data in which disassembled element data is accompanied by connection methods thereto is interpreted to decide the posture of the skeleton structure according to kinematics.

21. The receiver of claim 19 wherein the receiving means including a transmitting format of the received CG animation data is discriminated.

22. The receiver of claim 19, the receiving means including:
  (i) means for restoring the transferred skeleton structure data as initial information;
  (ii) means for assigning shape data that is attached to the restored skeleton structure data as an initial state, to the skeleton structure; and
  (iii) means for deciding the posture of the skeleton structure based on the transferred element data and the transferred connection method.

23. The receiver of claim 19, the receiving means including:
  (i) means for restoring the transferred skeleton structure and the motion information of the skeleton structure; and
  (ii) means for restoring the transferred moving picture image data stream and deciding the posture of the skeleton structure by using the transferred method of altering moving picture data.

24. The receiver of claim 19, the receiving means including means for estimating the transferred three-dimensional virtual space, dividing the three-dimensional virtual space into sub-three-dimensional virtual space similar to the three-dimensional virtual space, hierarchically dividing the sub-three-dimensional virtual space, and restoring the position of the target portion in the three-dimensional virtual space, based on the dimension and dividing size of the sub-three-dimensional virtual space, the rotation matrix in the local coordinate system in response to the movement of the character, and information relative to the positions of the hierarchized sub-three-dimensional virtual spaces, to decide the posture of the skeleton structure based on the element data relative to the motion data of the transferred skeleton structure in the three-dimensional virtual space.

25. The receiver of claim 19, the receiving means including:
  (i) means for estimating the transferred three-dimensional virtual space, dividing the three-dimensional virtual space into sub-three-dimensional virtual space similar to the three-dimensional virtual space, hierarchically dividing the sub-three-dimensional virtual space, and restoring the position of the target portion in the three-dimensional virtual space, based on the dimension and dividing size of the sub-three-dimensional virtual space, the rotation matrix in the local coordinate system in response to the movement of the character, and information relative to the positions of the hierarchized sub-three-dimensional virtual spaces; and
  (ii) means for restoring the continuous postures of the skeleton structure of the character by spatially interpolating blocks being isolated from each other based on the transferred interpolation information under the conditions that the target portions are isolated, to decide the posture of the skeleton structure based on the element data relative to the transferred motion data.

26. The receiver of claim 19, the receiving means including:
  (i) means for estimating the transferred three-dimensional virtual space, dividing the three-dimensional virtual space into sub-three-dimensional virtual space similar to the three-dimensional virtual space, hierarchically dividing the sub-three-dimensional virtual space, and restoring the position of the target portion in the three-dimensional virtual space, based on the dimension and dividing size of the sub-three-dimensional virtual space, the rotation matrix in the local coordinate system in response to the movement of the character, and information relative to the positions of the hierarchized sub-three-dimensional virtual spaces; and
  (ii) means for restoring the posture and shape of the skeleton structure of the character based on the three-dimensional angle information of the arbitrarily designated part of the skeleton structure, to decide the posture of the skeleton structure based on the element data relative to the transferred motion data.

27. The receiver of claim 19, the receiving means including:
  means for estimating a three-dimensional virtual space covering a moving range of the character, dividing the three-dimensional virtual space into sub-three-dimensional virtual spaces similar to the three-dimensional virtual space, hierarchically dividing the sub-three-dimensional virtual spaces, and displaying the positions of target portions of the skeleton structure of the character in the three-dimensional virtual space, based on the dimension and dividing size of the sub-three-dimensional virtual space, movement with rotation matrix in the local coordinate system in response to the movement of the CG character, and information relative to the position of the hierarchized sub-three-dimensional virtual spaces, to detect collision of the motion of the transferred skeleton structure in three-dimensional virtual space.

28. A receiver of claim 19, the receiving means including:
  (i) means for deciding the position of the character as a receiving object in the three-dimensional virtual space, based on either of the transferred information relative to positions; and
  (ii) means for altering the position of the character in the three-dimensional virtual space based on the transferred information relative to the positions adjacent to another sub-three-dimensional virtual space, under the conditions that the position of the character was altered at the transmitting end to set the moving points of the transferred skeleton structure in three-dimensional virtual space.

29. A receiver of three-dimensional skeleton structure motions in which motion data of a skeleton structure in three-dimensional computer graphics (CG) is transmitted from a transmitting end to a receiving end and, based on the transmitted skeleton structure motion data, to create animation at the receiving end, comprising:
  (1) transferring means for transferring the CG animation data from a transmitting end computer to a receiving end computer by a receiving program on the receiving end computer; and
  (2) receiving means in which the CG animation data from the transmitting end is received, and, for the first format, the intial information and the time series data is interpreted to decide the posture of the skeleton structure according to kinematics and, for the second format, the initial information and the data in which the disassembled element data is accompanied by the connection methods thereto is interpreted to decide the posture of the skeleton structure according to kinematics.

30. A recording medium having recorded thereon a receiving program of three-dimensional skeleton structure motions for receiving motion data of a skeleton structure in three-dimensional computer graphics (CG) transmitted from a transmitting end to a receiving end and, based on transmitted skeleton structure motion data, for creating animation at the receiving end, the receiving program comprising:

(1) means for transferring CG animation data from a transmitting end computer to a receiving end computer; and (2) receiving means in which the CG animation data from the transmitting end is received, and, for a first format, initial information and time series data is interpreted to decide a posture of the skeleton structure according to kinematics and, for a second format, initial information and data in which disassembled element data is accompanied by connection methods thereto is interpreted to determine a posture of the skeleton structure according to kinematics.

31. The receiver of claim 29, the receiving means including a transmitting format of the received CG animation data is discriminated.

32. A receiver of claim 31, the receiving means including:
(i) means for restoring the transferred skeleton structure data as initial information;
(ii) means for assigning shape data that is attached to the restored skeleton structure data as an initial state, to the skeleton structure; and
(iii) means for deciding the posture of the skeleton structure based on the transferred element data and the transferred connection method.

33. The receiver of claim 31, the receiving means including:
(i) means for restoring the transferred skeleton structure and the motion information of the skeleton structure; and
(ii) means for restoring the transferred moving picture image data stream and deciding the posture of the skeleton structure by using the transferred method of altering moving picture image.

34. The receiver of claim 31, the receiving means including:
means for estimating the transferred three-dimensional virtual space, dividing the three-dimensional virtual space into sub-three-dimensional virtual spaces similar to the three-dimensional virtual space, hierarchically dividing the sub-three-dimensional virtual spaces, and restoring the position of the target portion in the three-dimensional virtual space, based on the dimension and dividing size of the sub-three-dimensional virtual space, the rotation matrix in the local coordinate system in response to the movement of the character, and information relative to the positions of the hierarchized sub-three-dimensional virtual spaces, to decide the posture of the skeleton structure based on the element data relative to the motion data of the transferred skeleton structure in the three-dimensional virtual space.

35. The receiver of claim 31, the receiving means including:
(i) means for estimating the transferred three-dimensional virtual space, dividing the three-dimensional virtual space into sub-three-dimensional virtual space similar to the three-dimensional virtual space, hierarchically dividing the sub-three-dimensional virtual space, and restoring the position of the target portion in the three-dimensional virtual space, based on the dimension and dividing size of the sub-three-dimensional virtual space, the rotation matrix in the local coordinate system in response to the movement of the character, and information relative to the positions of the hierarchized sub-three-dimensional virtual spaces, to decide the posture of the skeleton structure based on the element data relative to the motion data of the transferred skeleton structure in the three-dimensional virtual space; and
(ii) means for restoring the continuous postures of the skeleton structure of the character by spatially interpolating blocks being isolated from each other based on the transferred interpolation information under the conditions that the target portions are isolated, to decide the posture of the skeleton structure based on the element data relative to the transferred motion data.

36. The receiver of claim 29, the receiving means including:
(i) means for estimating the transferred three-dimensional virtual space, dividing the three-dimensional virtual space into sub-three-dimensional virtual space similar to the three-dimensional virtual space, hierarchically dividing the sub-three-dimensional virtual space, and restoring the position of the target portion in the three-dimensional virtual space, based on the dimension and dividing size of the sub-three-dimensional virtual space, the rotation matrix in the local coordinate system in response to the movement of the character, and information relative to the positions of the hierarchized sub-three-dimensional virtual spaces, to decide the posture of the skeleton structure based on the element data relative to the motion data of the transferred skeleton structure in the three-dimensional virtual space; and
(ii) means for restoring the posture and shape of the skeleton structure of the character based on the three-dimensional angle information of the arbitrarily designated part of the skeleton structure, to decide the posture of the skeleton structure based on the element data relative to the transferred motion data.

37. The receiver of claim 31, the receiving means including means for estimating a three-dimensional virtual space covering a moving range of the character, dividing the three-dimensional virtual space into sub-three-dimensional virtual spaces similar to the three-dimensional virtual space, hierarchically dividing the sub-three-dimensional virtual spaces, and displaying the positions of target portions of the skeleton structure of the character in the three-dimensional virtual space, based on the dimension and dividing size of the sub-three-dimensional virtual space, movement with rotation matrix in the local coordinate system in response to the movement of the CG character, and information relative to the position of the hierarchized sub-three-dimensional virtual spaces, to detect collision of the motion of the transferred skeleton structure in three-dimensional virtual space.

38. The receiver of claim 31, the receiving means including:
(i) means for deciding the position of the character as a receiving object in the three-dimensional virtual space, based on either of the transferred information relative to positions; and
(ii) means for altering the position of the character in the three-dimensional virtual space based on the transferred information relative to the positions adjacent to another sub-three-dimensional virtual space, under the conditions that the position of the character was altered at the transmitting means side, to set the moving points of the transferred skeleton structure in three-dimensional virtual space.

* * * * *